United States Patent [19]
O'Donnell

[11] Patent Number: 5,497,302
[45] Date of Patent: Mar. 5, 1996

[54] LIGHTED HUBCAP

[76] Inventor: Walter O'Donnell, 953 Spur Dr. North, Bayshore, N.Y. 11706

[21] Appl. No.: 358,405

[22] Filed: Dec. 19, 1994

[51] Int. Cl.⁶ ...................................................... B60Q 1/00
[52] U.S. Cl. ............................. 362/78; 362/35; 362/184; 362/251; 362/276; 362/394; 362/802
[58] Field of Search ................................ 362/78, 35, 183, 362/184, 455, 251, 276, 394, 800, 802, 190, 191, 252, 269, 806, 375; 200/52 R, 61.39, 61.45 R, 61.46, 61.47, 61.49, 80 A, 80 B, 80 R; 446/47, 242, 438, 439

[56] References Cited

U.S. PATENT DOCUMENTS

| | | | |
|---|---|---|---|
| 3,396,269 | 8/1968 | Sorenson | 362/455 |
| 4,562,516 | 12/1985 | Chastain | 362/78 |
| 4,725,928 | 2/1988 | Strepek | 362/78 |
| 4,775,919 | 10/1988 | Pearsall et al. | 362/78 |
| 4,782,421 | 11/1988 | Park | 362/78 X |
| 4,893,877 | 1/1990 | Powell et al. | 362/78 X |
| 5,016,144 | 5/1991 | DiMaggio | 362/78 X |
| 5,392,200 | 2/1995 | Milde | 362/802 X |

*Primary Examiner*—Ira S. Lazarus
*Assistant Examiner*—Thomas M. Sember
*Attorney, Agent, or Firm*—Michael I. Kroll

[57] ABSTRACT

A lighted hubcap for a hub on a wheel of an automobile, comprising a round cover that snaps onto the hub. A structure in the round cover is for illuminating the round cover. A facility in the round cover is for supplying electrical power to the illuminating structure, only when the automobile moves along and rotates the wheel with the round cover.

2 Claims, 2 Drawing Sheets

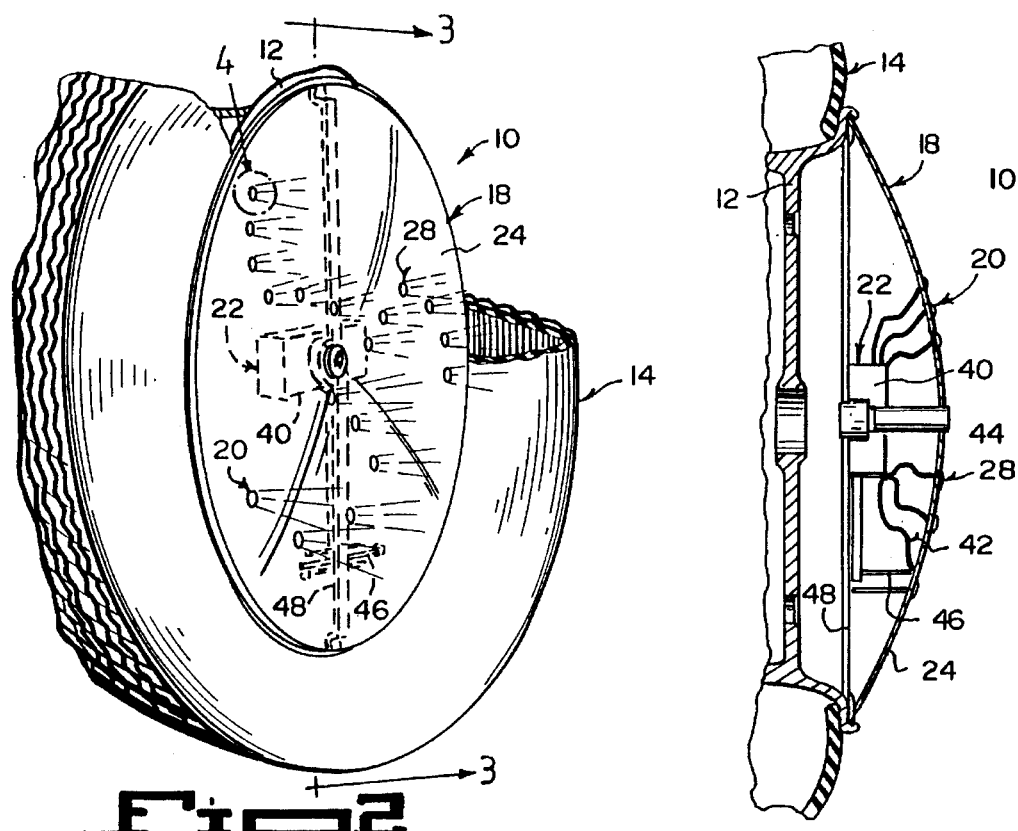
Fig.2 (BATTERY VERSION)
Fig.3 (BATTERY VERSION)
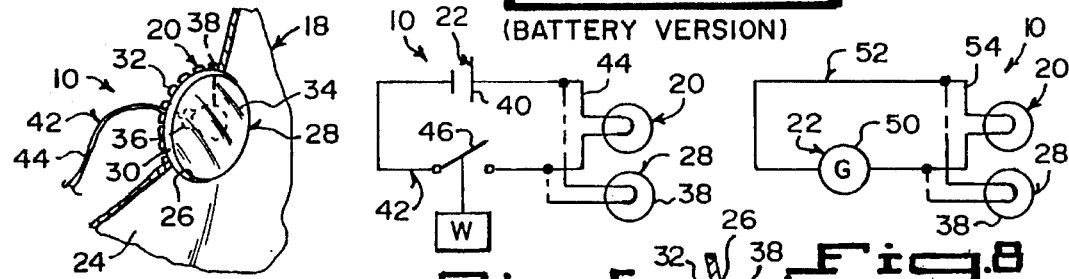
Fig.4
Fig.6
Fig.8
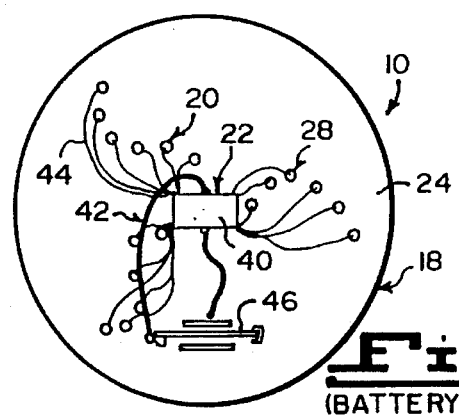
Fig.5 (BATTERY VERSION)
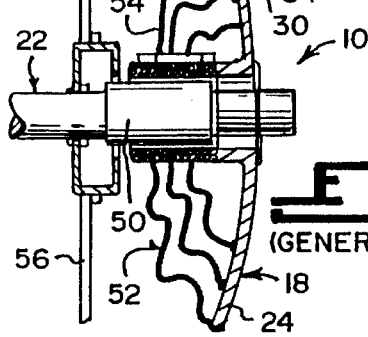
Fig.7 (GENERATOR VERSION)

LIGHTED HUBCAP

BACKGROUND OF THE INVENTION

1. Field of the Invention

The instant invention relates generally to hubcaps and more specifically it relates to a lighted hubcap.

2. Description of the Prior Art

Numerous hubcaps have been provided in prior art that are round metal coverings clamped over the hubs of automobile wheels. While these units may be suitable for the particular purpose to which they address, they would not be as suitable for the purposes of the present invention as heretofore described.

SUMMARY OF THE INVENTION

A primary object of the present invention is to provide a lighted hubcap that will overcome the shortcomings of the prior art devices.

Another object is to provide a lighted hubcap for a hub on a wheel of an automobile, in which light bulbs in an array of lamp units in the hubcap are illuminated by a weight actuated switch in a circuit between a battery and the lamp units, only when the automobile is moving along and rotating the wheel with the hubcap.

An additional object is to provide a lighted hubcap for a hub on a wheel of an automobile, in which light bulbs in an array of lamp units in the hubcap are illuminated by a generator in a circuit, only when the automobile is moving along and rotating the wheel with the hubcap.

A further object is to provide a lighted hubcap that is simple and easy to use.

A still further object is to provide a lighted hubcap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 2 is an enlarged perspective view of one of the wheels with the tire broken away, showing a first embodiment of the instant invention being a battery powered version.

FIG. 3 is a cross sectional view taken along line 3—3 in FIG. 2.

FIG. 4 is an enlarged perspective view of one of the lamp units as indicated by arrow 4 in FIG. 2.

FIG. 5 is a diagrammatic front view of the first embodiment.

FIG. 6 is a cross sectional view with parts broken away similar to FIG. 3, showing a second embodiment of the instant invention being a generator powered version.

FIG. 7 is a view of the generator version of the instant invention.

FIG. 8 is an electrical schematic of the instant invention.

Similar reference characters denote corresponding features consistently throughout the attached drawings.

DETAILED DESCRIPTION OF THE PREFERRED EMBODIMENTS

Figure 1:
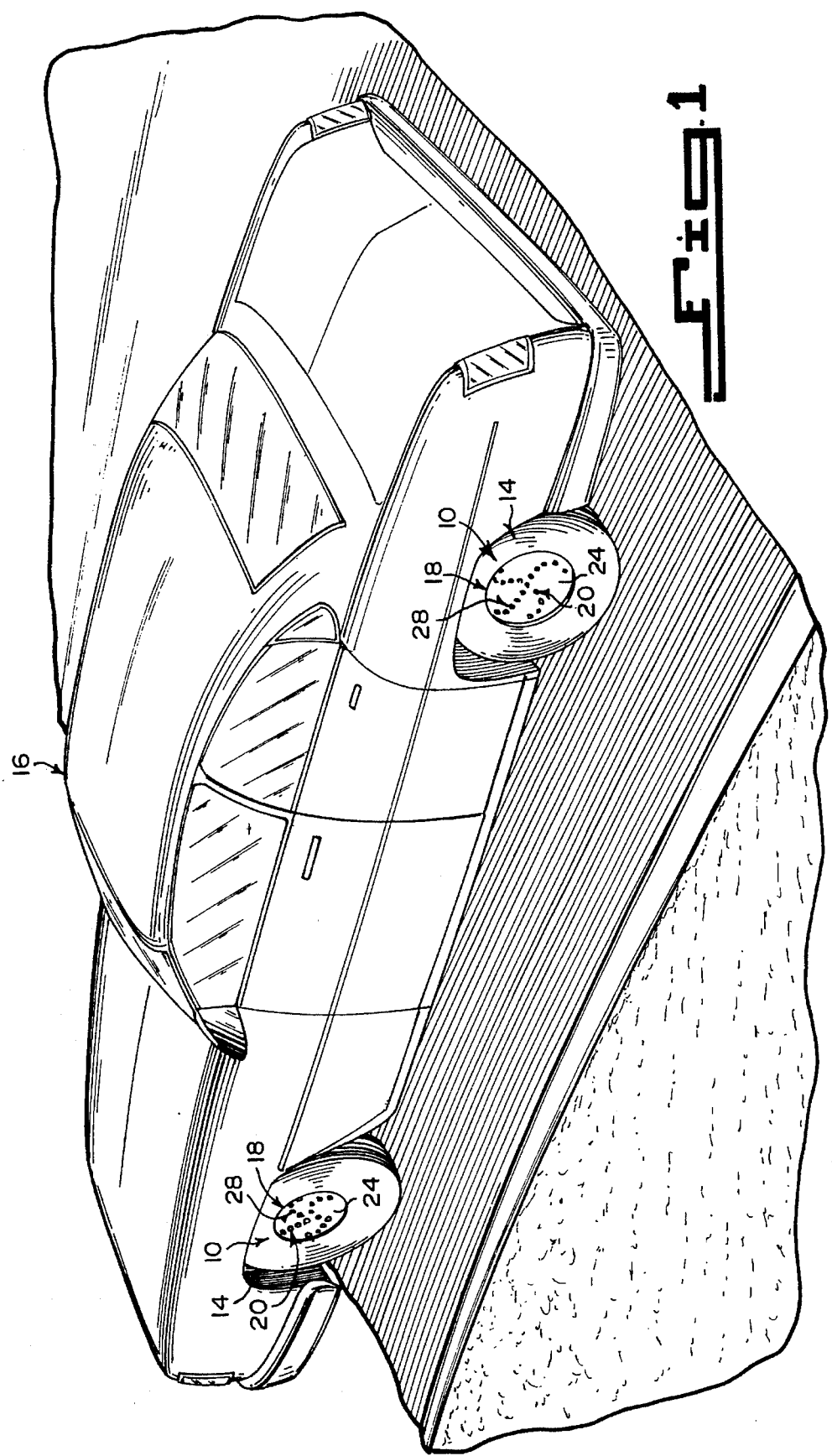
FIG. 1 is a perspective view of an automobile, showing the instant invention installed on the wheels.

Turning now descriptively to the drawings, in which similar reference characters denote similar elements throughout the several views, FIGS. 1 through 8 illustrate a lighted hubcap 10 for a hub 12 on a wheel 14 of an automobile 16, comprising a round cover 18 that snaps onto the hub 12. A structure 20 in the round cover 18, is for illuminating the round cover 18. A facility 22 in the round cover 18, is for supplying electrical power to the illuminating structure 20, only when the automobile 16 moves along and rotates the wheel 14 with the round cover 18.

The round cover 18 is a metal convex hubcap 24, having a plurality of small apertures 26 therethrough. The illuminating structure 20 is a plurality of lamp units 28, each mounted through one aperture 26 in the hubcap 24.

Each lamp unit 28 consists of a ring-shaped frame 30 having a plurality of radial tabs 32 extending therefrom to lock into one small aperture 26 in the hubcap 24. A lens 34 is mounted in the frame 30. A socket 36 is on the frame 30 behind the lens 34. A light bulb 38 is carried in the socket 36, to provide a source of light therefrom.

The lamp units 28 are placed in a specific array on the hubcap 24 for an aesthetic appearance. The specific array of the lamp units 28 is in a triskelion pattern in the hubcap 24. The lamp units 28 are in three curved branch formations radiating from a common center of the hubcap 24.

As shown in FIGS. 2, 3, 5 and 6, the electrical power supplying facility 22 includes a battery 40. An electric circuit 42 connects the battery 40 with parallel wiring 44 to all of the sockets 36 with the light bulbs 38 in the lamp units 28. A normally opened weight activated switch 46 is connected in the electric circuit 42, between the battery 40 and all of the socket 36 in the lamp units 28. When the hubcap 24 rotates when the automobile 16 moves along, the switch 46 will close by centrifugal force, causing the light bulbs 38 to illuminate.

A support strut 48 extends diametrically across the back of the hubcap 24. The support strut 48 will retain the battery 40 centrally and the switch 46 off center on the hubcap 24.

The electrical power supplying facility 22 in FIGS. 7 and 8, consists of a generator 50. An electric circuit 52 connects the generator 50 with parallel wiring 54 to all of the sockets 36 with the light bulbs 38 in the lamp units 28. When the hubcap 24 rotates when the automobile 16 moves along, the generator 50 will operate causing the light bulbs 38 to illuminate.

A support strut 56 extends diametrically across the back of the hubcap 24. The support strut 56 will retain the generator 50 centrally on the hubcap 24.

OPERATION OF THE INVENTION

To use the lighted hubcap 12, the following steps should be taken:

1. Snap the round cover 18 being the hubcap 24 onto the hub 12 on the wheel 44 of the automobile 16.
2. Make sure that all of the lamp units 28 are in place in their respective small apertures 26 in the hubcap 24.
3. Start the engine of the automobile 16.
4. Put the engine in gear and drive the automobile 16 forward.
5. The switch 46 will close to allow the battery to supply electrical power to the light bulbs 38, when the hubcap 24 rotates with the hub 12 on the wheel 14.
6. Or the generator 50 will start to operate to supply electrical power to the light bulbs 38, when the hubcap 24 rotates with the hub 12 on the wheel 14.

LIST OF REFERENCE NUMBERS

10 lighted hubcap for 12
12 hub on 14
14 wheel of 16
16 automobile
18 round cover of 10
20 illuminating structure of 10
22 electrical power supplying facility
24 metal convex hubcap for 18
26 small aperture in 24
28 lamp unit of 20
30 ring-shaped frame of 28
32 radial tab on 30
34 lens of 28
36 socket of 28
38 light bulb in 36
40 battery of 22
42 electric circuit of 22 for 40
44 parallel wiring of 42
46 normally opened weight activated switch
48 support strut for 40 and 46
50 generator of 22
52 electric circuit of 22 for 50
54 parallel wiring of 52
56 support strut for 50

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A lighted hubcap for a hub on a wheel of an automobile comprising:

a) a round cover that snaps onto the hub, said round cover being made of metal and having a convex shape and having a plurality of small apertures therethrough;

b) means in said round cover, for illuminating said round cover, said illuminating means being a plurality of lamp units, each lamp unit mounted through one said aperture in said hubcap, each said lamp unit including a ring-shaped frame having a plurality of radial tabs extending therefrom to lock into
   said apertures in said hubcap's cover, a lens mounted in said frame, a socket on said frame behind said lens, and a light bulb carried in said socket, to provide a source of light therefrom, said lamp units being placed in a specific array on said hubcap for an aesthetic appearance, said specific array of said lamp units being in a triskelion pattern in said hubcap, in which said lamp units are in three curved branch formations radiating from a common center of said hubcap;

c) means in said round cover, for supplying electrical power to said illuminating means only when the automobile moves along and rotates the wheel with said round cover, said electrical power supplying means including a battery, an electric circuit connecting said battery with parallel wiring to all of said sockets with said light bulbs in said lamp units, and a normally opened weight activated switch connected in said electric circuit between said battery and all of said sockets in said lamp units, so that when said hubcap rotates when the automobile moves along, said switch will close by centrifugal force, causing said light bulbs to illuminate; and d) a support strut extending diametrically across the back of said hubcap, so as to retain said battery centrally and said switch off center on said hubcap.

2. A lighted hubcap for a hub on a wheel of an automobile comprising:

a) a round cover that snaps onto the hub, said round cover being made of metal and having a convex shape, and having a plurality of small apertures therethrough;

b) means in said round cover, for illuminating said round cover, said illuminating means being a plurality of lamp units, each lamp unit mounted through said apertures in said hubcap's round cover, each said lamp unit including a ring-shaped frame having a plurality of radial tabs extending therefrom to lock into said apertures in said hubcap's round cover, a lens mounted in said frame, a socket on said frame behind said lens, and a light bulb carried in said socket, to provide a specific array on said hubcap for an aesthetic appearance, said specific array being in a triskelion pattern in said hubcap, in which said lamp units are in three curved branch formations radiating from a common center of said hubcap;

c) means in said round cover, for supplying electrical power to said illuminating means only when the automobile moves along and rotates the wheel with said round cover, said electrical power supplying means including a generator, an electric circuit connecting said generator with parallel wiring to all of said sockets with said lamp bulbs in said lamp units, and a normally opened weight activated switch connected in said electric circuit between said generator and all of said sockets in said lamp units, so that when the said hubcap rotates when the automobile moves along, said switch will close by centrifugal force, causing said light bulbs to illuminate; and d) a support strut extending diametrically across the back of said hubcap, so as to retain said generator centrally and said switch off center on said hubcap.

\* \* \* \* \*